United States Patent
Jung et al.

(10) Patent No.: US 8,588,185 B2
(45) Date of Patent: Nov. 19, 2013

(54) APPARATUS AND METHOD FOR PERFORMING HANDOVER IN MULTIPLE COMPONENT CARRIER SYSTEM

(75) Inventors: Myung Cheul Jung, Seoul (KR); Ki Bum Kwon, Ansan-si (KR)

(73) Assignee: Pantech Co., Ltd., Seoul (KR)

( * ) Notice: Subject to any disclaimer, the term of this patent is extended or adjusted under 35 U.S.C. 154(b) by 169 days.

(21) Appl. No.: 13/181,456

(22) Filed: Jul. 12, 2011

(65) Prior Publication Data

US 2012/0014357 A1 Jan. 19, 2012

(30) Foreign Application Priority Data

Jul. 14, 2010 (KR) ........................ 10-2010-0068157

(51) Int. Cl.
*H04W 4/00* (2009.01)
(52) U.S. Cl.
USPC ......................................................... 370/332
(58) Field of Classification Search
USPC .................. 370/328–339; 455/436–444
See application file for complete search history.

(56) References Cited

U.S. PATENT DOCUMENTS

2011/0200014 A1* 8/2011 Lee et al. ...................... 370/332
2011/0275374 A1* 11/2011 Narasimha et al. ........... 455/436
2012/0002643 A1* 1/2012 Chung et al. .................. 370/331

FOREIGN PATENT DOCUMENTS

| KR | 1020080080803 | 9/2008 |
| KR | 1020080087370 | 10/2008 |
| WO | 2010/024591 | 3/2010 |

OTHER PUBLICATIONS

International Search Report issued on Feb. 24, 2012 for International Application No. PCT/KR2011/005111.

* cited by examiner

*Primary Examiner* — Frank Duong
(74) *Attorney, Agent, or Firm* — H.C. Park & Associates, PLC

(57) ABSTRACT

A method for performing handover in a multiple component carrier system includes a UE transmitting a measurement report message, including measurement values for one or more cells, to a source BS, the source BS transmitting a handover request message, including at least one of a candidate cell list including at least one candidate cell to be used in a target BS, an aggregatable cell list including at least one aggregatable cell in which UE capability is taken into consideration, and a list of sensible cells including at least one cell defined based on a similarity sensitivity of a measured frequency, to the target BS based on the measurement value, the source BS checking the cell included in the at least one list, receiving a handover ACK message including a final cell from the target BS, and determining handover, and the source BS transmitting a handover command message to the UE.

13 Claims, 20 Drawing Sheets

APPARATUS AND METHOD FOR PERFORMING HANDOVER IN MULTIPLE COMPONENT CARRIER SYSTEM

This application claims priority from and the benefit under 35 U.S.C. §119(a) of Korean Patent Application No. 10-2010-0068157, filed on Jul. 14, 2010, the disclosure of which is incorporated herein by reference for all purposes.

BACKGROUND

1. Field

The following description relates to wireless communication and, more particularly, to an apparatus and method for performing handover in a multiple component carrier system.

2. Discussion of the Background

Cellular communication is a concept that has been introduced to overcome the restriction of a service area and the restriction of frequency and subscriber capacity. Cellular communication includes a method for providing coverage by changing a single high-output base station into a plurality of low-output base stations. That is, a mobile communication service area is divided into several small cells, different frequencies are allocated to neighboring cells, and the same frequency band is used by two cells which are sufficiently spaced apart from each other, thus not having interference therebetween, so that the frequency can be spatially reused.

Handover refers to a function in which, if a user equipment exits a current communication service area (hereinafter referred to as a 'serving cell') and moves to a neighboring communication service area (hereinafter referred to as a 'neighbor cell'), the user equipment is tuned with a new traffic channel of the neighbor cell, thus continuously maintaining a traffic state. A user equipment communicating with a specific base station (hereinafter referred to as a 'source base station (BS)' is linked to another neighbor base station (hereinafter referred to as a 'target BS') through handover if the intensity of a signal in the source base station becomes weak. When handover is performed, a problem, such as call disconnection occurring when a user equipment moves from one cell to a neighbor cell, can be solved.

In general, a wireless communication system uses one bandwidth for data transmission. For example, the $2^{nd}$ generation wireless communication system uses a bandwidth of 200 KHz to 1.25 MHz, and the $3^{rd}$ generation wireless communication system uses a bandwidth of 5 MHz to 10 MHz. In order to support an increasing transmission capacity, the bandwidth of a recent 3GPP LTE or 802.16m has extended to 20 MHz or higher. To increase the bandwidth may be considered indispensable so as to increase the transmission capacity, but to support a high bandwidth even when the quality of service required is low may generate great power consumption.

In order to solve such problem, there has emerged a multiple component carrier system in which a component carrier having one bandwidth and the center frequency are defined, and data is transmitted or received through a plurality of component carriers using a wide band. That is, a narrow band and a wide band are supported at the same time by using one or more component carriers. For example, if one component carrier corresponds to a bandwidth of 5 MHz, a bandwidth of a maximum 20 MHz can be supported by using four component carriers.

However, in a handover in a base station using a single component carrier, the base station only performs the handover by taking only a single cell, measured and reported by a user equipment, into consideration. In case of a multiple component carrier system, however, the handover procedure must be performed by taking multiple component carriers into consideration. To this end, a target base station has to configure component carriers necessary for a user equipment through the handover procedure and has to provide a quality of service to the degree that a source base station provided the quality of service to the user equipment. In this case, it is difficult to configure an adequate level of component carriers or appropriate component carriers because the target base station may not accurately determine the quality of service was provided to the user equipment before the handover. Accordingly, there is a need for an apparatus and method for performing handover by taking multiple component carriers into consideration.

SUMMARY

Aspects of the present invention may provide a method for a user equipment selecting component carriers or a cell by informing a new base station of a state in which service was provided by a previous base station when the user equipment selects component carriers to be used in the new base station through handover in a multiple component carrier system.

Aspects of the present invention may provide a method and apparatus in which a source base station configures a candidate cell list, including at least one candidate cell which will be used in a target base station, based on a value measured by a user equipment in a multiple component carrier system.

Aspects of the present invention may provide a method and apparatus in which a source base station configures an aggregatable cell list including an at least one aggregatable cell by taking user equipment capability into consideration, in a multiple component carrier system.

Aspects of the present invention may provide a method and apparatus in which a source base station configures a list of sensible cells including at least one cell defined as the similar sensitivity of a measured frequency, in a multiple component carrier system.

Aspects of the present invention may provide a method and apparatus in which a source base station requests handover by using at least one of a candidate cell list including at least one candidate cell to be used in a target base station, an aggregatable cell list including at least one aggregatable cell in which user equipment capability is taken into consideration, and a list of sensible cells including at least one cell defined as the similar sensitivity of a measured frequency, based on a measurement value in a multiple component carrier system.

Aspects of the present invention may provide a method and apparatus in which a source base station receives handover admission, including information about a finally selected cell, from a target base station and performs handover based on the received handover admission in a multiple component carrier system.

Additional features of the invention will be set forth in the description which follows, and in part will be apparent from the description, or may be learned by practice of the invention.

An exemplary embodiment provides a method for performing handover in a multiple component carrier system. The method includes a User Equipment (UE) transmitting a measurement report message, including measurement values for one or more cells, to a source Base Station (BS), the source BS transmitting a handover request message, including at least one of a candidate cell list including at least one candidate cell to be used in a target BS, an aggregatable cell list including at least one aggregatable cell in which UE capability is taken into consideration, and a list of sensible cells including at least one cell defined based on a similarity sensitivity of a measured frequency, to the target BS based on the measurement value, the source BS checking the cell included in the at least one list, receiving a handover ACK message including a final cell from the target BS, and determining handover, and the source BS transmitting a handover command message to the UE.

An exemplary embodiment provides an apparatus for performing handover in a multiple component carrier system. The apparatus includes a measurement report reception unit for receiving a measurement report message, including a measurement value for at least one cell, from a UE, a cell list configuration unit for configuring a candidate cell list including at least one candidate cell to be used in a target BS, an aggregatable cell list including at least one aggregatable cell in which UE capability is taken into consideration, and a list of sensible cells including at least one cell defined based on a similarity degree of a measured frequency base on the measurement value, and a message transmission/reception unit for transmitting a handover request message, including at least one of the candidate cell list, the aggregatable cell list, and the list of sensible cells, to the target BS and for receiving a handover ACK message, including a final cell determined by target BS from among the cells included in the at least one list, from the target BS.

An exemplary embodiment provides a method for a source Base Station (BS) performing handover in a multiple component carrier system. The method includes receiving a measurement report including measurement results for one or more cells configured by a carrier aggregation, from a User Equipment (UE), configuring service state information including a candidate cell list in which the one or more cells are arranged in order based on the measurement results, transmitting a handover request message, including the service state information and requesting the UE to perform handover to a target BS, to the target BS, receiving a handover ACK message, indicating admission of the handover, from the target BS, and transmitting a handover command message, commanding the handover, to the UE.

An exemplary embodiment provides a method for a target BS performing handover in a multiple component carrier system. The method includes receiving service state information, including a candidate cell list in which one or more cells configured by a carrier aggregation are arranged in order based on measurement results for the one or more cells, from a source BS through a handover request message, and transmitting a handover ACK message, indicating admission of the handover, to the source BS.

An exemplary embodiment provides a source BS to perform handover in a multiple component carrier system. The source BS includes a measurement report reception unit for receiving a measurement report, including measurement results for one or more cells configured by a carrier aggregation, from a UE, a cell list configuration unit for configuring a candidate cell list in which the one or more cells are arranged in order based on the measurement results, and a message transmission/reception unit for transmitting, to the target BS, a handover request message including the candidate cell list and requesting the UE to perform handover to a target BS and for receiving, from the target BS, a handover ACK message, indicating admission of the handover.

An exemplary embodiment provides a method for a UE performing handover in a multiple component carrier system. The method includes transmitting, to a source BS, a measurement report, including measurement results regarding one or more cells configured by a carrier aggregation and a candidate cell list in which the one or more cells are arranged in order based on the measurements, receiving, from the source BS, a handover command message instructing the UE to perform handover to a target BS, and reconfiguring the one or more cells which are included in the candidate cell list and available in the target BS.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
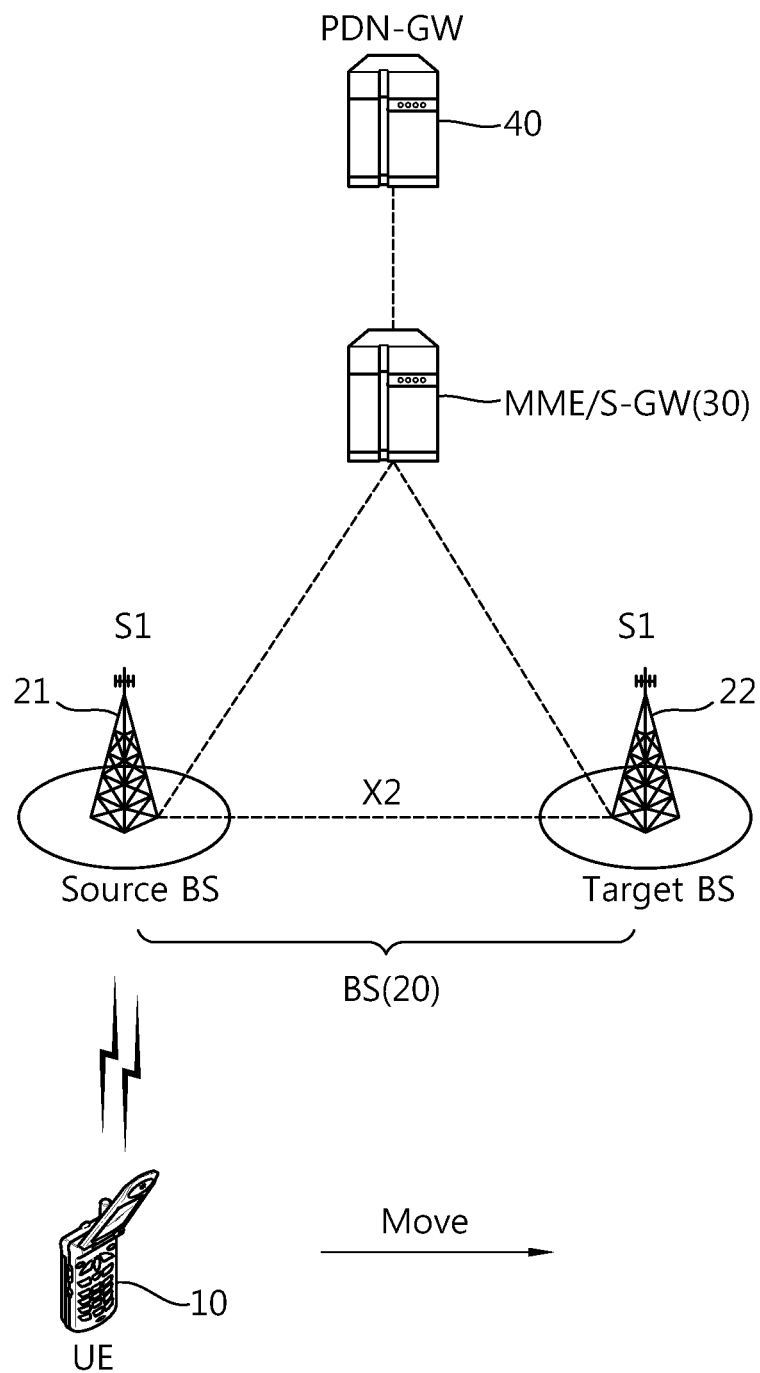
FIG. 1 is a diagram showing a wireless communication system according to aspects of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Furthermore, in describing the elements of this specification, terminologies, such as the first, the second, A, B, (a), and (b), may be used. The terminologies are used to only distinguish elements from one another, but the essence, sequence and the like of the elements are not limited by the terminologies. Furthermore, in the case where one element is described to be "connected", "coupled", or "linked" to the other element, the one element may be directly connected or coupled to the other element, but it is be understood that a third element may be "connected", "coupled", or "linked" between the elements.

It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g., XYZ, XZ, YZ).

Furthermore, in this specification, a communication network is chiefly described. However, tasks performed in the communication network may be performed in a process in which a system (e.g., a base station) managing the communication network controls the communication network and sends data or may be performed in a user equipment connected to the communication network.

FIG. 1 is a diagram showing a wireless communication system according to aspects of the present invention. The wireless communication system may be a network structure including an Evolved-Universal Mobile Telecommunications System (E-UMTS). The E-UMTS system may be a Long Term Evolution (LTE) system. Wireless communication systems are widely deployed in order to provide various kinds of communication services, such as voice and packet data.

Multiple access schemes applied to the wireless communication system are not limited and may include multiple access schemes, such as Code Division Multiple Access (CDMA), Time Division Multiple Access (TDMA), Frequency Division Multiple Access (FDMA), Orthogonal Frequency Division Multiple Access (OFDMA), and Single Carrier Frequency Division Multiple Access (SC-FDMA), OFDM-FDMA, OFDM-TDMA, and OFDM-CDMA, may be used. Uplink transmission and downlink transmission may be performed by a Time Division Duplex (TDD) scheme using different times or by a Frequency Division Duplex (FDD) scheme using different frequencies.

Referring to FIG. 1, an evolved UMTS Terrestrial Radio Access Network (E-UTRAN) includes at least one Base Station (BS) 20 providing a control plane and a user plane. A User Equipment (UE) 10 may be fixed or mobile and may also be referred to by other terminology, such as a Mobile Station (MS), an Advanced MS (AMS), a User Terminal (UT), a Subscriber Station (SS), or a wireless device.

The BS 20 commonly refers to a fixed station that communicates with the UEs 10, and the BS 20 may also be referred to by other terminology, such as an evolved-NodeB (eNB), NodeB, a Base Transceiver System (BTS), or an access point. The BS 20 provides service to the UE 10 through at least one cell. The cell is geographical area or a frequency band in which the BS 20 provides communication service. The BS 20 and the UE 10 are connected with each other through Uu interface. The Uu interface may be used for transmission of user traffic or control traffic between the BS 20 and the UE 10. The Uu interface may be defined as a virtual link where the virtual link is defined in radio path between the BS 20 and the UE 10.

An interface for user traffic or control traffic transmission may be used between the BSs 20. A source BS 21 refers to a BS having a radio link set up with the UE 10, and a target BS 22 refers to a BS to which the UE 10 will perform handover in order to set up a new radio link after breaking the existing radio link with the source BS 21. In other words, the Uu is a term which is used within the 3GPP project and the Uu interface is a logical interface to introduce the radio (air) interface between the radio BS 20 and UE 10.

Hereinafter, downlink refers to communication from the BS 20 to the UE 10, and uplink refers to communication from the UE 10 to the BS 20. Downlink may also be called a forward link, and uplink may also be called a reverse link. In downlink, a transmitter may be part of the BS 20 and a receiver may be part of the UE 10. In uplink, a transmitter may be part of the UE 10 and a receiver may be part of the BS 20.

The BSs 20 may be interconnected through an X2 interface. The X2 interface is used to exchange messages between the BSs 20. The X2 interface may be implemented via a wired and/or wireless connection between the BSs 20. The BS 20 is connected to an Evolved Packet System (EPS), for example, a Mobility Management Entity (MME)/Serving Gateway (S-GW) 30, through an S1 interface. The S1 interface supports a many-to-many-relation between the BSs 20 and the MME/S-GW 30. In order to provide packet data service to the MME/S-GW 30, a PDN-GW 40 may be used. The PDN-GW 40 may be varied according to traffic purposes or a kind of service. The PDN-GW 40 supporting specific service may be found based on Access Point Name (APN) information.

Intra E-UTRAN handover may be used when handover is performed between E-UTRAN access networks. The intra E-UTRAN handover may include X2-based handover and S1-based handover. The X2-based handover may be used when the UE 10 performs handover from the source BS 21 to the target BS 22 using the X2 interface. Here, the MME/S-GW 30 may remain.

Through the S1-based handover, a first radio link set up among the P-GW 40, the MME/S-GW 30, the source BS 21, and the UE 10 is released, and a second radio link is newly set up among the P-GW 40, the MME/S-GW 30, the target BS 22, and the UE 10.

A carrier aggregation (CA) supports a plurality of carriers, and the CA may also be called a spectrum aggregation or a bandwidth aggregation. An individual unit carrier bound by the carrier aggregation is referred to as a Component Carrier (CC). Each CC is defined by the bandwidth and the center frequency. The carrier aggregation is used to support an increasing throughput, prevent an increase of the costs due to the introduction of broadband RF (radio frequency) devices, and guarantee compatibility with the existing system.

For example, assuming that 5 CCs are allocated as the granularity of a carrier unit having a bandwidth of 5 MHz, a maximum of a 25 MHz bandwidth can be supported.

Figure 2:
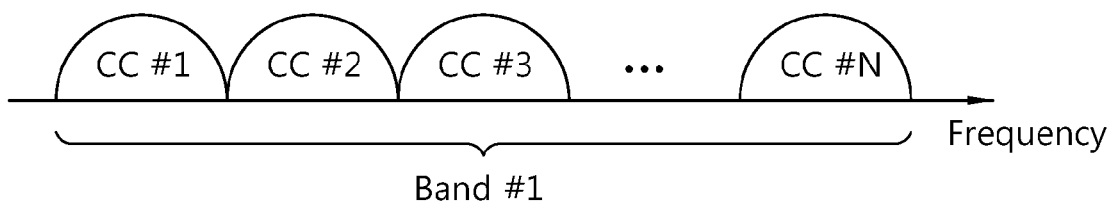
FIG. 2 is a diagram illustrating an intra-band contiguous carrier aggregation according to aspects of the present invention.
Figure 3:
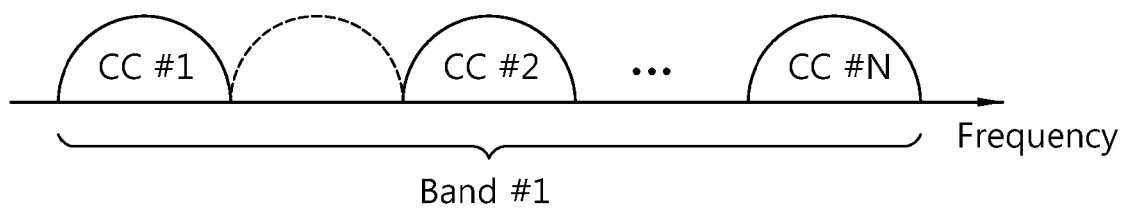
FIG. 3 is a diagram illustrating an intra-band non-contiguous carrier aggregation according to aspects of the present invention.
Figure 4:
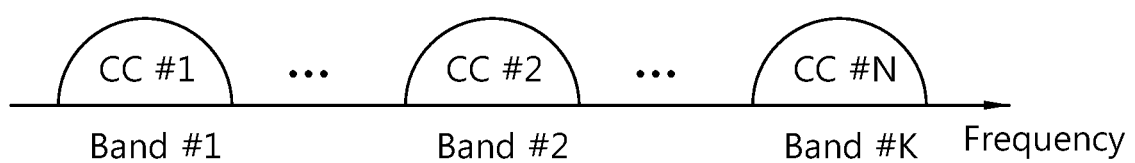
FIG. 4 is a diagram illustrating an inter-band carrier aggregation according to aspects of the present invention.

The carrier aggregation may include an intra-band contiguous carrier aggregation, such as that shown in FIG. 2, an intra-band non-contiguous carrier aggregation, such as that shown in FIG. 3, and an inter-band carrier aggregation, such as that shown in FIG. 4. FIG. 2 is a diagram illustrating an intra-band contiguous carrier aggregation according to aspects of the present invention. FIG. 3 is a diagram illustrating an intra-band non-contiguous carrier aggregation according to aspects of the present invention. FIG. 4 is a diagram illustrating an inter-band carrier aggregation according to aspects of the present invention.

Referring first to FIG. 2, the intra-band contiguous carrier aggregation is performed among CCs which are contiguous with one another within the same band. For example, all CC#1, CC#2, CC#3, . . . , CC #N (i.e., aggregated CCs) are contiguous with one another.

Referring to FIG. 3, the intra-band non-contiguous carrier aggregation is performed among discontinuous CCs. For example, CC#1 and CC#2 (i.e., aggregated CCs) are spaced apart from each other and may have a specific frequency interposed therebetween.

Referring to FIG. 4, in the inter-band carrier aggregation, one or more of a plurality of CCs are aggregated on different frequency bands. For example, a CC #1 (i.e., an aggregated CC) exists in a band #1 and a CC #2 (i.e., an aggregated CC) exists in a band #2.

The number of aggregated downlink CCs and the number of aggregated uplink CCs may be differently set. When the number of downlink CCs is identical to the number of uplink CCs, it is called a symmetric aggregation. When the number of downlink CCs is different from the number of uplink CCs, it is called an asymmetric aggregation.

Furthermore, CCs may have different sizes (i.e., bandwidths). For example, assuming that 5 CCs are used to form a 70 MHz band, a resulting configuration may be, for example, 5 MHz CC (carrier #0)+20 MHz CC (carrier #1)+20 MHz CC (carrier #2)+20 MHz CC (carrier #3)+5 MHz CC (carrier #4).

Hereinafter, the term 'multiple component carrier system' refers to a system supporting the carrier aggregation. In the multiple component carrier system, a contiguous carrier aggregation or a non-contiguous carrier aggregation or both may be used. Furthermore, either a symmetrical aggregation or an asymmetrical aggregation may be used.

Figure 5:
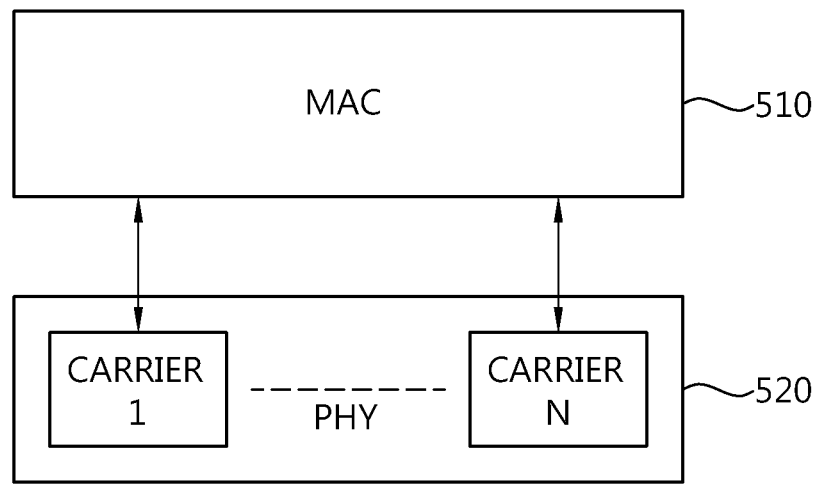
FIG. 5 is a diagram showing an example of a protocol structure for supporting multiple component carriers according to aspects of the present invention.

FIG. 5 is a diagram showing an example of a protocol structure for supporting multiple component carriers according to aspects of the present invention.

Referring to FIG. 5, a common Medium Access Control (MAC) entity 510 manages a physical (PHY) layer 520 using a plurality of CCs. A MAC management message transmitted through a specific CC may be applied to other CCs. That is, the MAC management message may control other CCs including the specific CC. The physical layer 520 may be operated according to the TDD scheme or the FDD scheme or both.

There may be several physical control channels used in the physical layer 520. A Physical Downlink Control Channel (PDCCH) used to transmit physical control information informs a UE of the resource allocation of a PCH (paging channel), a downlink shared channel (DL-SCH), and Hybrid Automatic Repeat Request (HARQ) information related to the DL-SCH. The PDCCH may carry an uplink grant, informing a UE of the allocation of resources for uplink transmission.

A Physical Control Format Indicator Channel (PCFICH) is used to inform a UE of the number of OFDM symbols used in the PDCCHs and may be transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information, such as a Channel Quality Indicator (CQI). A Physical Uplink Shared Channel (PUSCH) carries an UL-SCH (uplink shared channel).

Figure 6:
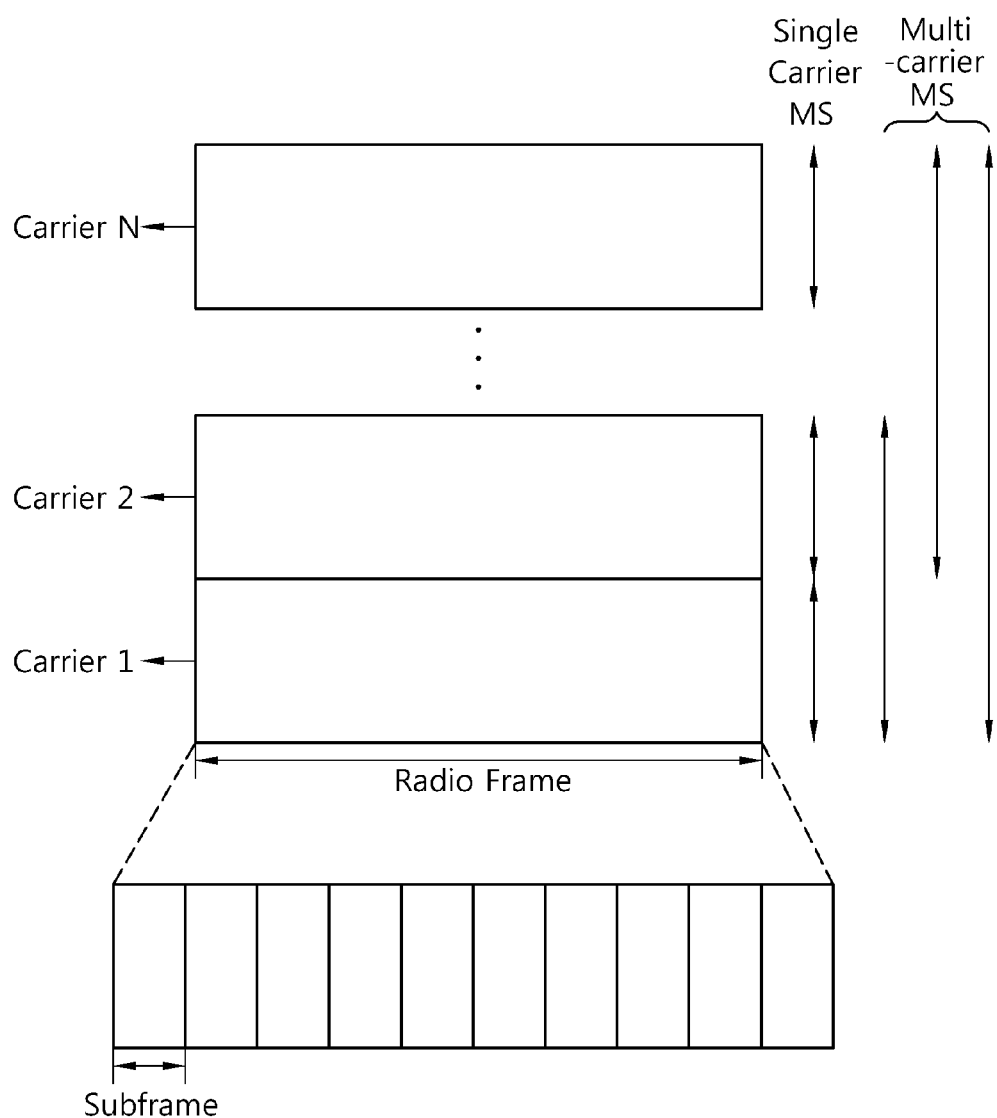
FIG. 6 is a diagram showing an example of a frame structure for a multiple component carrier operation according to aspects of the present invention.

FIG. 6 is a diagram showing an example of a frame structure for a multiple carrier operation according to aspects of the present invention.

Referring to FIG. 6, a radio frame includes of 10 subframes. Each of the subframes includes a plurality of OFDM symbols. Each CC may carry a control channel (e.g., a PDCCH). The CCs may be contiguous to each other or may not be contiguous to each other. A UE can support one or more CCs according to its capability.

Figure 7:
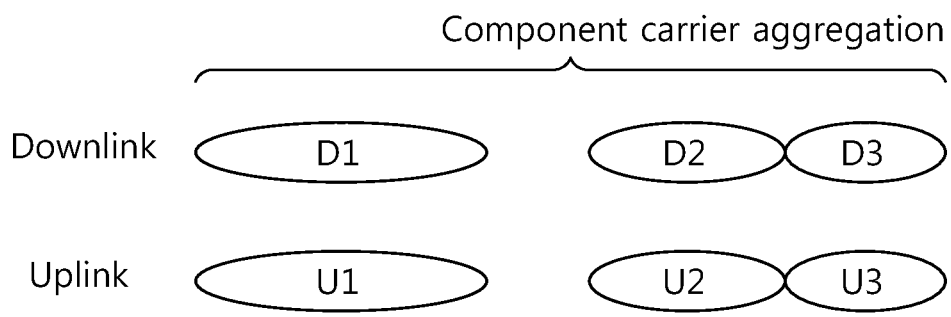
FIG. 7 is a diagram showing linkage between a downlink component carrier and an uplink component carrier in a multiple component carrier system according to aspects of the present invention.

FIG. 7 is a diagram showing linkage between a downlink component carrier and an uplink component carrier in a multiple component carrier system according to aspects of the present invention.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is the index of a DL CC, and Ui is the index of an UL CC (where i=1, 2, 3).

In an FDD system, a DL CC and an UL CC are linked to each other in a one-to-one manner. For example, D1 and U1, D2 and U2, and D3 and U3 are linked to each other in a one-to-one manner. A UE sets up linkages between the DL CCs and the UL CCs based on system information transmitted on a logical channel BCCH or a UE-dedicated RRC message transmitted on a DCCH. Each piece of linkage may be set up in a cell-specific way or a UE-specific way.

Examples of an UL CC linked to a DL CC include:
1) A UL CC through which a UE will transmit ACK/NACK information with respect to data transmitted by a BS through a DL CC;
2) A DL CC through which a BS will transmit ACK/NACK information with respect to data transmitted by a UE through an UL CC;
3) A DL CC through which a BS will transmit a response to a Random Access Preamble (RAP), transmitted through an UL CC by a UE which starts a random access procedure, if the BS receives the RAP; and
4) A UL CC to which uplink control information is applied if a BS transmits the uplink control information through a DL CC.

FIG. 7 illustrates only the 1:1 linkage between the DL CC and the UL CC; however, aspects are not limited thereto such that pieces of linkage, such as 1:n or n:1, may be set up. Furthermore, the index of a CC need not coincide with the order of the CC or the location of a frequency band of the CC.

Figure 8:
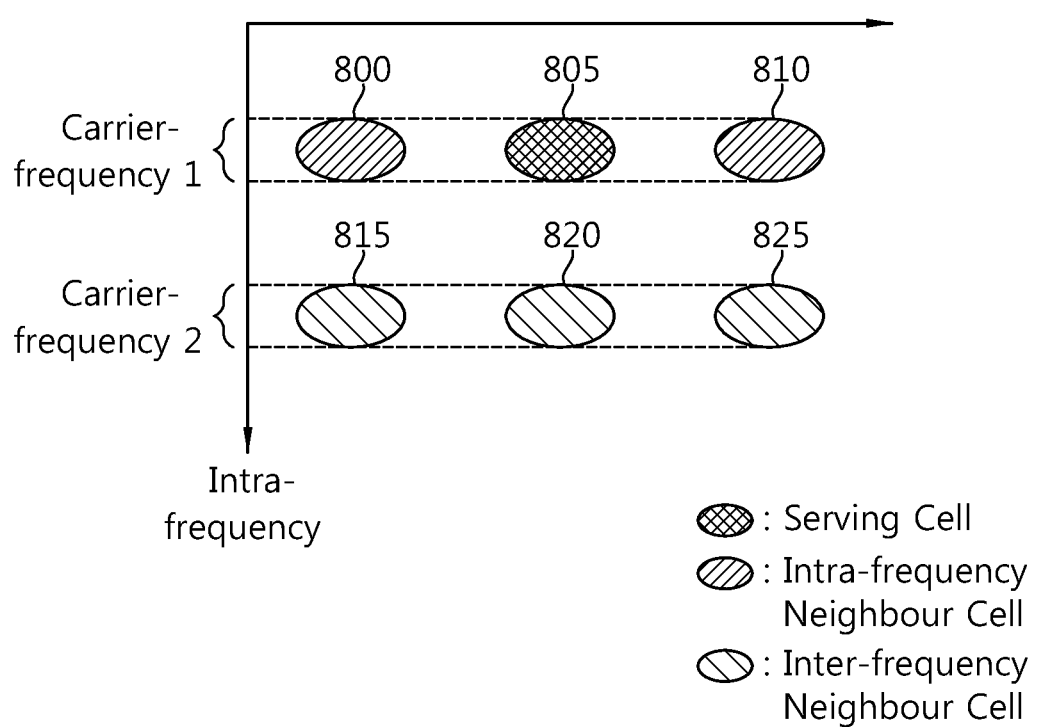
FIG. 8 is a diagram illustrating a serving cell and a neighbor cell according to aspects of the present invention.

FIG. 8 is a diagram illustrating a serving cell and a neighbor cell according to aspects of the present invention.

Referring to FIG. 8, a system frequency band may be classified into a plurality of carrier frequencies. Here, the carrier frequency may be the center frequency of a cell. The cell may include downlink frequency resources and uplink frequency resources. In some embodiments, the cell may include a combination of downlink frequency resources and optional uplink frequency resources. Furthermore, if a carrier aggregation is not taken into consideration, one cell always includes of a pair of uplink and downlink frequency resources.

A serving cell 805 refers to a cell in which service is being provided to a UE. A neighbor cell refers to a cell adjacent to the serving cell 805 geographically or on the frequency band. Neighbor cells, with respect to the serving cell 805, using the same carrier frequency are called intra-frequency neighbor cells 800 and 810. Furthermore, neighbor cells, with respect to the serving cell 805, using different carrier frequencies are called inter-frequency neighbor cells 815, 820, and 825. That is, a serving cell and neighbor cells (i.e., not only cells using the same frequency as the serving cell, but also cells using a different frequency from the serving cell) may be called neighbor cells.

If a UE performs handover from the serving cell 805 to the intra-frequency neighbor cell 800 or 810 is called intra-frequency handover. Meanwhile, if a UE performs handover from the serving cell 805 to the inter-frequency neighbor cell 815, 820, or 825 is called inter-frequency handover.

In order for packet data to be transmitted and received through a specific cell, a UE first has to complete the configuration of a specific cell or CC. The term 'configuration' may include a state in which the reception of system information necessary for data transmission and reception for a relevant cell or CC has been completed. For example, the configuration may include the entire process of receiving common physical layer parameters necessary for data transmission and reception, MAC layer parameters, or parameters necessary for a specific operation in an RRC layer. A configured cell or CC is in a state in which packets can be instantly transmitted and received when only signaling information, indicating that packet data can be transmitted, is received.

Meanwhile, a configured cell may exist in an activation state or a deactivation state. The activation state and the deactivation state allow a UE to monitor or receive a control channel (e.g., PDCCH) and a data channel (e.g., PDSCH) only in the activation state so that the battery consumption of the UE can be minimized. Here, the initial state of the cell immediately after the cell is configured may be a deactivation state.

The activation state indicates that a cell is transmitting or receiving traffic data and is in a ready state. In order to check resources (e.g., frequency and time) allocated thereto, the UE can monitor or receive a control channel (PDCCH) and a data channel (PDSCH) of an activated cell.

The deactivation state indicates that a cell cannot transmit or receive traffic data, but can perform measurement or transmit and receive minimal information. A UE can receive system information (SI) necessary to receive packets from a deactivated cell. However, a UE may not monitor or receive the control channel (PDCCH) and the data channel (PDSCH) of a deactivated cell in order to check resources allocated thereto.

Figure 9:
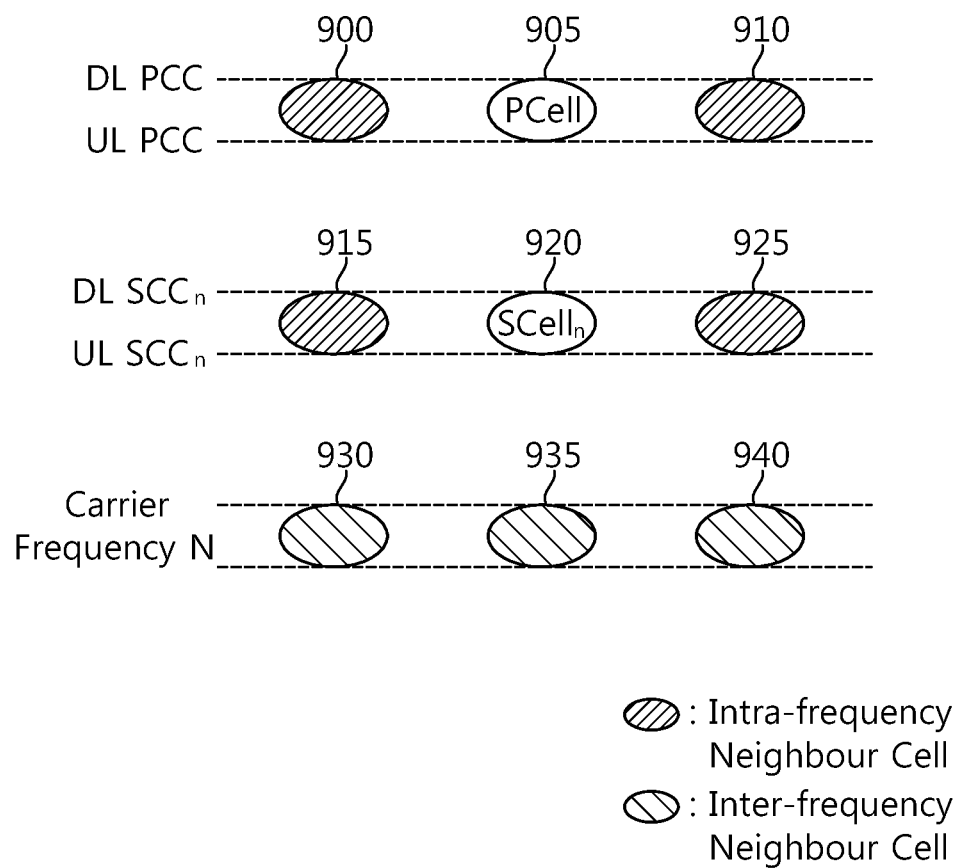
FIG. 9 is a diagram illustrating a primary serving cell and a secondary serving cell according to aspects of the present invention.

FIG. 9 is a diagram illustrating a primary serving cell and a secondary serving cell according to aspects of the present invention.

Referring to FIG. 9, a primary serving cell PCell 905 refers to one serving cell that provides security input and NAS mobility information in an RRC establishment or re-establishment state. At least one cell, together with the primary serving cell 905, may be configured to form a set of serving cells according to the capabilities of a UE. Here, the at least one cell may be called a secondary serving cell SCell 920.

Accordingly, a set of serving cells configured for one UE may include only the one primary serving cell 905 or may include the one primary serving cell 905 and the at least one secondary serving cell 920.

The intra-frequency neighbor cells 900 and 910 of the primary serving cell 905 belong to the same carrier frequency, and the intra-frequency neighbor cells 915 and 925 of the secondary serving cell 920 belong to the same carrier frequency. Furthermore, the inter-frequency neighbor cells 930, 935, and 940 of the primary serving cell 905 and the secondary serving cell 920 belong to a different carrier frequency from the primary serving cell 905 and the secondary serving cell 920.

A DL CC corresponding to the primary serving cell 905 is called a downlink primary component carrier (DL PCC), and an UL CC corresponding to the primary serving cell 905 is called an uplink primary component carrier (UL PCC). Furthermore, in downlink, a CC corresponding to the secondary serving cell 920 is called a downlink secondary component carrier (DL SCC). In uplink, a CC corresponding to the secondary serving cell 920 is called an uplink secondary component carrier (UL SCC).

The PCC is a CC to which a UE is connected or RRC connected at the early stage, from among several CCs. The PCC is a special CC that is responsible for connection or RRC connection for signaling regarding a number of CCs and for the management of UE context information (i.e., connection information related to the UE). Furthermore, the PCC is always in the activation state, when the PCC is connected to a UE and in an RRC connected mode.

The SCC is a CC allocated to a UE in addition to the PCC. The SCC is a carrier extended for the additional allocation of resources to a UE in addition to the PCC. The state of the SCC may be divided into the activation state and the deactivation state. The initial state of the SCC may be the deactivation state.

The primary serving cell 905 and the secondary serving cell 920 may have at least one or more of the following characteristics:

First, the primary serving cell 905 may be used to transmit a PUCCH.

Second, the primary serving cell 905 may be always activated, whereas the secondary serving cell 920 may be activated or deactivated according to specific conditions.

Third, if the primary serving cell 905 experiences a radio link failure (RLF), RRC re-establishment is triggered. However, if the secondary serving cell 920 experiences an RLF, RRC re-establishment may not be triggered.

Fourth the primary serving cell 905 may be changed by a change of a security key or a handover procedure accompanied by a Random Access Channel (RACH) procedure.

Accordingly, procedures, such as the reconfiguration, adding, and removal of the secondary serving cell 920, may be performed by the RRC layer. In newly adding the secondary serving cell 920, RRC signaling may be used in order to transmit system information about a dedicated secondary serving cell.

In handover in which a carrier aggregation is taken into consideration, both the primary serving cell 905 and the secondary serving cell 920 must be taken into consideration. For example, if the primary serving cell 905 is changed into the secondary serving cell 920 in the same BS, the handover corresponds to an intra BS (or intra eNB) handover. If the primary serving cell 905 is changed into the secondary serving cell 920 in a different BS, the handover corresponds to an inter BS (or inter eNB) handover.

Figure 10:
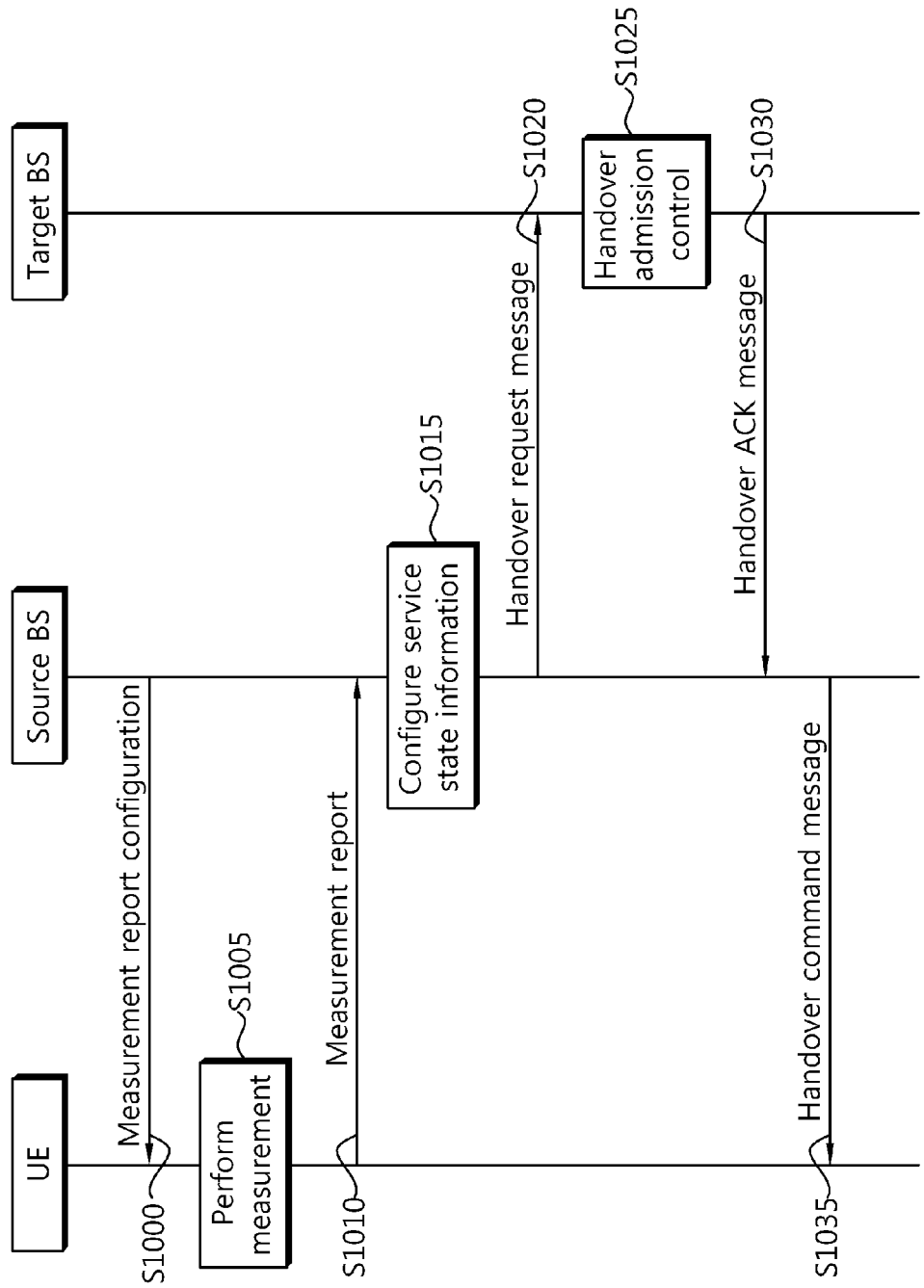
FIG. 10 is a flowchart illustrating a method for performing handover according to an exemplary embodiment of the present invention.

FIG. 10 is a flowchart illustrating a method for performing handover according to an exemplary embodiment of the present invention.

Referring to FIG. 10, a source BS transmits a measurement report configuration to a UE in operation S1000. The measurement report configuration may be provided by UE-dedicated signaling, such as an RRC connection reconfiguration message. The measurement report configuration is control information for configuring operating conditions, such as the criterion and format of a measurement report, in a UE. For example, the operating conditions may include a period in which the measurement report is performed or a triggering condition by a specific event.

Here, a unit of measure used in the measurement report includes quantities or values (e.g., a Reference Signal Received Power (RSRP) and a Reference Signal Received Quality (RSRQ)) which may be used by a UE in order to determine the triggering condition of the measurement report. The RSRP and the RSRQ may be defined as follows. The RSRP may be a measured value for signal strength or power which is received from cell-specific reference signal. The RSRQ may be a measured value for signal quality which is obtained by comparing the reception strength of all received signals and the reception strength of a desired signal. The RSRP may be determined by a linear average for power contribution of resource elements. Here, the resource elements carry a cell-specific reference signal within a measurement frequency band width that is considered. The reference point of the RSRP is the antenna connector of a UE. Meanwhile, the RSRQ is defined as a ratio of the RSRP and a Received Signal Strength Indicator (RSSI), as shown in Equation 1.

$$RSRQ = N \times \frac{RSRP}{RSSI} \quad \text{[Equation 1]}$$

In Equation 1, N is the number of resource elements of a carrier RSSI measurement bandwidth of a radio access network. In Equation 1, measurement for a numerator and a denominator is performed for a set of identical resource blocks. The RSSI includes a linear average of the total reception power. The total reception power is monitored only within an OFDM symbol including reference symbols within a measurement bandwidth and is obtained over N resource blocks. The reference symbols may be OFDM symbols in which a Cell-specific Reference Signal exists. In some embodiments, the reference symbols may be all OFDM symbols within a subframe.

The UE performs measurement based on the measurement report configuration in operation S1005. If the measurement report is triggered by the measurement result of a signal transmitted by a primary serving cell, the UE reports the measurement result to the source BS in operation S1010. The measurement result may refer to measurement values regarding measurable factors, such as the RSRP, the RSRQ, and the power level of a cell which are determined based on the measurement report configuration. The triggering may be performed according to conditions set in a system. For example, the triggering condition of the measurement report may be a channel state of a threshold or lower or a channel state of a threshold or higher.

The source BS configures service state information based on the reported measurement result in operation S1015. The service state information is UE-specific information which is transmitted from the source BS to a target BS. The service state information is information about a state in which the UE is supported by the source BS for traffic transmission. In other words, the service state information is transmitted from the source BS to the target BS during a handover to optimize connection with the target BS after the handover.

The service state information may include elements, such as those shown in Table below; however, aspects are not limited thereto.

TABLE 1

| Element | Description |
|---|---|
| Candidate Cell List | information for Candidate Cells and/or Measurement Results for Candidate Cells |
| The Number of CCs for SeNB | The number of CCs which are used by SeNB |
| UE Capability | available CCs (ex, number of CC, frequency for CC) |

Referring to Table 1, the service state information may include at least one of a candidate cell list, the number of CCs for a source BS (e.g., an SeNB), UE capacity, information about CCs included in a candidate cell list, and the RSRP or the RSRQ of cells having measurement reports.

The candidate cell list is a list of at least one candidate cell that may become a primary serving cell or a secondary serving cell in the target BS in a UE-specific way. That is, the source BS configures a list, including at least one candidate cell that may be configured suitably for the UE, by taking the current service state of the UE that will perform handover and informs the target BS of the configured list.

The target BS can select at least one candidate cell, included in the received candidate cell list, as the primary serving cell or the secondary serving cell with reference to the candidate cell list. Here, the candidate cell list is referred by only the target BS, and the target BS determines whether to select one or more of the cells, included in the candidate cell list, as the serving cell(s). The candidate cell may be a primary serving cell or a secondary serving cell.

The candidate cell list is information so that the UE may choose a suitable primary serving cell or a secondary serving cell. The target BS may use the candidate cell list to choose a serving cell or a secondary serving cell.

The number of CCs in use for the source BS indicates the total number of CCs, which the source BS provides the UE. The number of CCs in use for the source BS is information regarding how many CCs the source BS has provided a service to the UE. The approximate number of CCs that the target BS should support can be predicted from the number of CCs in use for the source BS. For instance, in a case where the source BS and the target BS are providing services via a similar frequency band, the UE may predict that the probability to get services with the similar number of CCs by the source BS is relatively high. The target BS may determine the CC configuration according to the services provided by the source BS.

In another aspect, the number of CCs for the source BS in use may be defined as the number of CCs that the source BS itself provides for the UE. In this case, the number of CCs for the source BS in use may be used as information on load that all the BSs provide for UEs. UE capability information may be defined as information on the maximum number of CCs used by a UE. In some cases, each UE's capability to use 2, 3, 4 or 5 CCs, etc. may be defined in the UE capability information. The source BS or the target BS can determine how many CCs should be provided for the UE by using the UE capability information.

The service state information is information indicative of a state in which the UE is receiving the source BS, and the service state information may further include various pieces of information for data transmission between the UE and the source BS in addition to the pieces of information listed in Table 1.

The source BS transmits a handover request message, including service state information, to the target BS in operation S1020. In particular, the target BS, which has received the handover request message, may determine handover by taking its current system load state, radio situations, etc., into consideration in operation S1025. The target BS, which has received the handover, performs a handover admission control process. The handover admission control process may include a procedure in which the target BS selects serving cells by reference to the received candidate cell list.

The target BS transmits a handover ACK message to the source BS in operation S1030. Here, the handover ACK message may include a list of the serving cells selected by the target BS.

If handover resource allocation is not successful because there are no resources available for the target BS, the target BS may transmit a handover preparation failure message to the source BS instead of the handover ACK message.

If the handover ACK message is received, the source BS informs the start of handover by transmitting a handover command message to the UE in operation S1035.

In summary, if the UE tries to perform handover and the source BS informs the target BS of service state information including a list of cells suitable for the UE, the target BS selects a cell or a CC based on the service state information. Accordingly, quality of service for the UE maintained or improved.

The candidate cell list may be configured so that a service state of the UE can be taken into consideration. To this end, the candidate cell list may be configured by taking factors affecting the service state of the UE into consideration. The factors affecting the service state of the UE may include, for example, the number of bands allocated to the source BS or the UE, information about whether a carrier aggregation is supported, a frequency characteristic, and the like. Various forms of candidate cell lists may be determined by taking such factors into consideration. A method for configuring a candidate cell list is hereinafter described in detail. From a viewpoint of a multiple component carrier system, the candidate cell list may be said to be a candidate CC list because a candidate cell may correspond to a candidate CC. A candidate CC may be referred to as a candidate cell and a candidate CC list may be referred to as a candidate cell list, for convenience of description.

Figure 11:
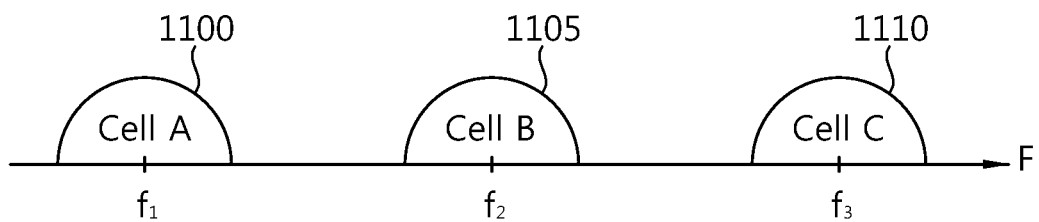
FIG. 11 is a diagram illustrating a method for configuring a candidate cell list according to an exemplary embodiment of the present invention.

FIG. 11 is a diagram illustrating a method for configuring a candidate cell list according to an exemplary embodiment of the present invention.

Referring to FIG. 11, in relation to frequency resources allocated to a UE, which are determined by a source BS, the UE performs measurement for cells A 1100, B 1105, and C 1110. The carrier frequencies of the cells A 1100, B 1105, and C 1110 are an $f_1$ MHz, an $f_2$ MHz, and an $f_3$ MHz, respectively. The carrier frequency may also be called the center frequency of a cell or may be the center frequency of a CC.

When the UE performs the measurement, measurement values, such as the RSRP, the RSRQ, and the power level of each cell, are obtained. If a measurement report is triggered, the UE transmits the measurement values to a source BS. The source BS which has received the measurement values may determine cells whose measurement value is an upper N number of cells as candidate cells. This method may be referred to as the best N report method.

For example, if it is assumed that the cell A 1100 has a measurement value of 10, the cell B 1105 has a measurement value of 8, and the cell C 1110 has a measurement value of 15, and N=2 according to the best N report method, the source BS may determine the cell C 1110 having the greatest measurement value and the cell A 1100 having the next greatest measurement value as candidate cells and configure a candidate cell list, such as that shown in Table 2, based on the candidate cells.

TABLE 2

| CANDIDATE CELL LIST | |
|---|---|
| CELL INDEX | CARRIER FREQUENCY |
| C | $f_3$ (e.g., 820 MHz) |
| A | $f_1$ (e.g., 800 MHz) |

Referring to Table 2, the candidate cell list includes candidate cell indices and pieces of carrier frequency information. The candidate cell indices include the cell C 1110 and the cell A 1100. The pieces of carrier frequency information include $f_3$ (e.g., 820 MHz) and $f_1$ (e.g., 800 MHz) for the cell C 1110 and the cell A 1100, respectively. The candidate cell index is an index indicative of each candidate cell. The cell C 1110 may be 2 (e.g., 010), and the cell A 1100 may be 0 (e.g., 000). There is no limit to the sequence in which the candidate cell indices are arranged in the candidate cell list. For example, the candidate cell indices may be arranged in order from a cell having the greatest measurement value to a cell having the smallest measurement value (i.e., according to priority), from among N cells, or may be randomly arranged irrespective of the measurement values. Alternatively, the N cells may be arranged according to the sequence of the indices. Assuming that N=1, the candidate cell list may be configured as in Table 3.

TABLE 3

| CANDIDATE CELL LIST | |
|---|---|
| CELL | CARRIER FREQUENCY |
| C | $f_3$ MHz |

If N=2 and a source BS and a target BS know pieces of carrier frequency information about respective cells, carrier frequency information need not be transmitted. Accordingly, the candidate cell list may include only candidate cell indices as in Table 4.

TABLE 4

| CANDIDATE CELL LIST |
|---|
| C |
| A |

However, if a target BS requires only a carrier frequency, a source BS may configure a candidate cell list including only N best carrier frequencies without a candidate cell index, as in Table 5.

TABLE 5

CANDIDATE CELL LIST $f_3$ MHz
$f_1$ MHz

Figure 12:
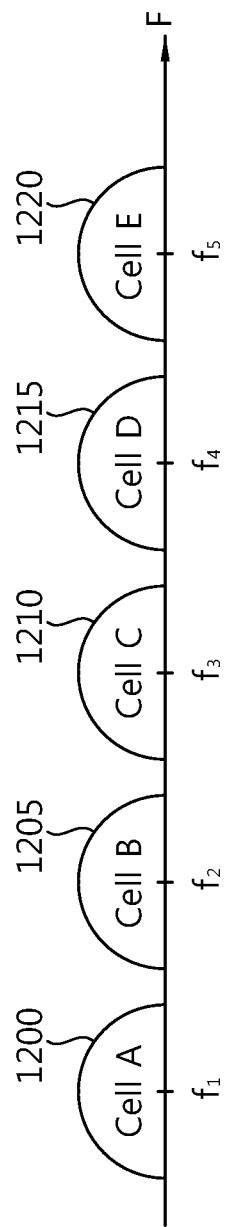
FIG. 12 is a diagram illustrating a method for configuring a candidate cell list according to an exemplary embodiment of the present invention.

FIG. 12 is a diagram illustrating a method for configuring a candidate cell list according to an exemplary embodiment of the present invention.

Referring to FIG. 12, the candidate cell list may include cells for all frequency resources which may be measured by a UE. Here, the candidate cell list may be configured so that cells included in the candidate cell list are arranged in order from a cell having a greater measurement value to a cell having a smaller measurement value according to a top-down method. Alternatively, the candidate cell list may be configured so that cells included in the candidate cell list are arranged in order from a cell having a smaller measurement value to a cell having a greater measurement value according to a bottom-up method.

A UE performs measurement for cells A 1200, B 1205, C 1210, D 1215, and E 1220. Carrier frequencies for the cells A 1200, B 1205, C 1210, D 1215, and E 1220 are $f_1$, $f_2$, $f_3$, $f_4$, and $f_5$, respectively. For example, it is assumed that the cell A 1200, the cell B 1205, the cell C 1210, the cell D 1215, and the cell E 1220 have respective measurement values shown in Table 6. Here, the measurement value may be a quantity or value, such as the RSRP and/or the RSRQ, and may be a dB value.

TABLE 6

| CELL | MEASUREMENT VALUE |
| --- | --- |
| A | 10 |
| B | 7 |
| C | 3 |
| D | 12 |
| E | 8 |

Referring to Table 6, if the candidate cells are arranged according to the top-down method, the candidate cells may be arranged according to the cell D 1215>the cell A 1200>the cell E 1220>the cell B 1205>the cell C 1210. Accordingly, the candidate cell list according to the top-down method is shown in Table 7.

TABLE 7

CANDIDATE CELL LIST

| CELL | CARRIER FREQUENCY |
| --- | --- |
| D | $f_4$ |
| A | $f_1$ |
| E | $f_5$ |
| B | $f_2$ |
| C | $f_3$ |

If the candidate cells are arranged according to the bottom-up method, the candidate cells may be arranged according to the cell C 1210>the cell B 1205>the cell E 1220>the cell A 1200>the cell D1215. Accordingly, the candidate cell list according to the bottom-up method is shown in Table 8.

TABLE 8

CANDIDATE CELL LIST

| CELL | CARRIER FREQUENCY |
| --- | --- |
| C | $f_3$ |
| B | $f_2$ |
| E | $f_5$ |
| A | $f_1$ |
| D | $f_4$ |

A source BS informs a target BS whether a candidate cell list is configured according to the top-down method or the bottom-up method. To this end, the source BS may transmit 1-bit information (i.e., flag information) about a method for configuring the candidate cell list to the target BS. For example, if the information about the configuration method indicates 1, the candidate cell list may be configured according to the top-down method. If the information about the configuration method indicates 0, the candidate cell list may be configured according to the bottom-up method.

If both the source BS and the target BS know that the candidate cell list is configured according to a specific method, the information about the configuration method may not be used.

The source BS may inform the target BS of only the sequence of the candidate cells, arranged according to respective measurement values, without the actual measurement value of each cell. Accordingly, the target BS can select upper N cells or lower M cells.

Figure 13:
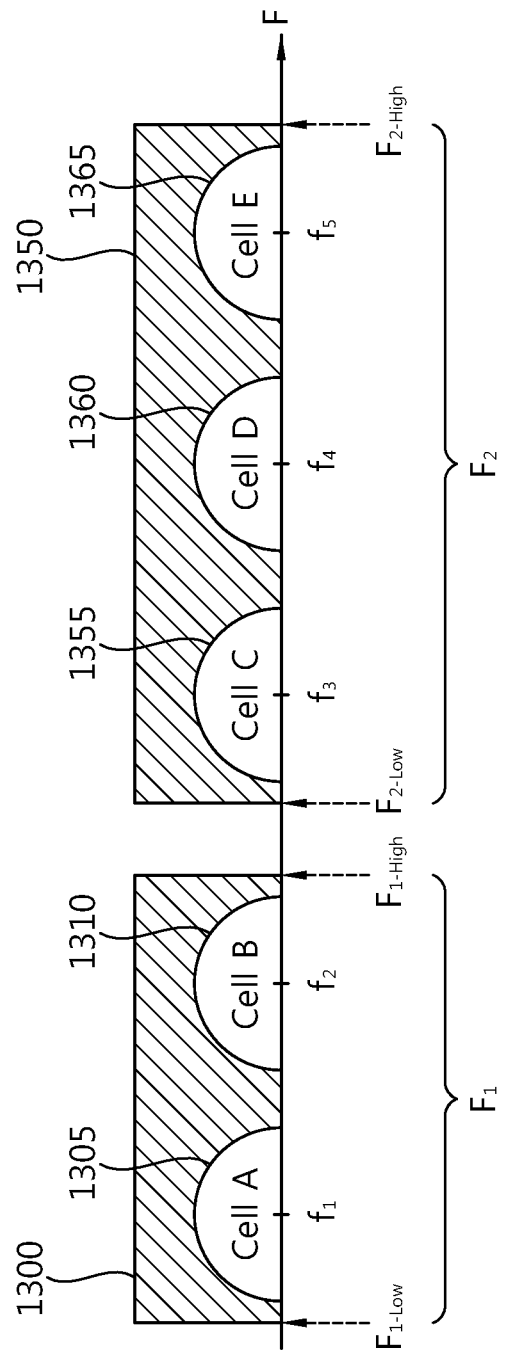
FIG. 13 is a diagram illustrating a method for configuring a candidate cell list according to an exemplary embodiment of the present invention.

FIG. 13 is a diagram illustrating a method for configuring a candidate cell list according to an exemplary embodiment of the present invention.

Referring to FIG. 13, a UE performs communication on an operating band $F_1$ 1300 or $F_2$ 1350, which are frequency bands allocated to each operator or each communication system. The operating bands are defined by the lowest frequency point $F_{Low}$ and the highest frequency point $F_{High}$. That is, the operating band $F_1$ 1300 is defined by $F_{1\_Low}$ and $F_{1\_High}$, and the operating band $F_2$ 1350 is defined by $F_{2\_Low}$ and $F_{2\_High}$. Furthermore, the operating band of downlink and the operating band of uplink are differently defined in an FDD system and identically defined in a TDD system. An example of the operating band is shown in Table 9 below.

TABLE 9

| Operating Band | Uplink Operating Band ($F_{UL\_Low}$-$F_{UL\_High}$) | Downlink Operating Band ($F_{DL\_Low}$-$F_{DL\_High}$) |
| --- | --- | --- |
| 1 | 1920 MHz-1980 MHz | 2110 MHz-2170 MHz |
| 2 | 1850 MHz-1910 MHz | 1930 MHz-1990 MHz |
| 3 | 1710 MHz-1785 MHz | 1805 MHz-1880 MHz |
| 4 | 1710 MHz-1755 MHz | 2110 MHz-2155 MHz |
| 5 | 824 Hz-849 MHz | 869 MHz-894 MHz |
| 6 | 830 MHz-840 MHz | 875 MHz-885 MHz |
| 7 | 2500 MHz-2570 MHz | 2620 MHz-2690 MHz |
| 8 | 880 MHz-915 MHz | 925 MHz-960 MHz |
| 9 | 1749.9 MHz-1784.9 MHz | 1844.9 MHz-1879.9 MHz |
| 10 | 1710 MHz-1770 MHz | 2110 MHz-2170 MHz |
| 11 | 1427.9 MHz-1447.9 MHz | 1475.9 MHz-1495.9 MHz |
| 12 | 698 MHz-716 MHz | 728 MHz-746 MHz |
| 13 | 777 MHz-787 MHz | 746 MHz-756 MHz |
| 14 | 788 MHz-798 MHz | 758 MHz-768 MHz |
| 15 | Reserved | Reserved |
| 16 | Reserved | Reserved |
| 17 | 704 MHz-716 MHz | 734 MHz-746 MHz |
| 18 | 815 MHz-830 MHz | 860 MHz-875 MHz |
| 19 | 830 MHz-845 MHz | 875 MHz-890 MHz |
| 20 | 832 MHz-862 MHz | 791 MHz-821 MHz |
| 21 | 1447.9 MHz-1462.9 MHz | 1495.9 MHz-1510.9 MHz |

TABLE 9-continued

| Operating Band | Uplink Operating Band ($F_{UL\_Low}$-$F_{UL\_High}$) | Downlink Operating Band ($F_{DL\_Low}$-$F_{DL\_High}$) |
|---|---|---|
| ... | ... | ... |
| 33 | 1900 MHz-1920 MHz | 1900 MHz-1920 MHz |
| 34 | 2010 MHz-2025 MHz | 2010 MHz-2025 MHz |
| 35 | 1850 MHz-1910 MHz | 1850 MHz-1910 MHz |
| 36 | 1930 MHz-1990 MHz | 1930 MHz-1990 MHz |
| 37 | 1910 MHz-1930 MHz | 1910 MHz-1930 MHz |
| 38 | 2570 MHz-2620 MHz | 2570 MHz-2620 MHz |
| 39 | 1880 MHz-1920 MHz | 1880 MHz-1920 MHz |
| 40 | 2300 MHz-2400 MHz | 2300 MHz-2400 MHz |

Referring to Table 9, the operating bands are indexed from 1 to 40. For example, $F_1$ may correspond to the index 4, and $F_2$ may correspond to the index 9. A UE, a source BS, and a target BS may employ the indices of the operating bands when performing a measurement procedure. For example, in order for a UE to perform measurement within a specific operating band, a source BS may inform the UE of configuration information about the measurement of the index of the specific operating band. Furthermore, a source BS may use the index of a specific operating band in order to indicate that a carrier frequency forming a candidate cell list is related to the specific operating band.

Referring back to FIG. 13, the operating band $F_1$ 1300 includes a cell A 1305 and a cell B 1310. The operating band $F_2$ 1350 includes a cell C 1355, a cell D 1360, and a cell E 1365. The carrier frequencies of the cell A 1305, the cell B 1310, the cell C 1355, the cell D 1360, and the cell E 1365 are $f_1$, $f_2$, $f_3$, $f_4$, and $f_5$, respectively. For example, it is assumed that the cell A 1305, the cell B 1310, the cell C 1355, the cell D 1360, and the cell E 1365 have respective measurement values listed in Table 10. Here, the measurement values are quantities or values, such as the RSRP and/or the RSRQ, and may be a dB value.

TABLE 10

| CELL | MEASUREMENT VALUE |
|---|---|
| A | 10 |
| B | 7 |
| C | 3 |
| D | 12 |
| E | 8 |

If the candidate cell list is configured on an operating-band basis, it leads to a candidate cell list such as that shown in Table 11.

TABLE 11

Candidate Cell List

| Band Index | Cell | Carrier Frequency |
|---|---|---|
| 4 (Index of $F_1$) | A | $f_1$ |
|  | B | $f_2$ |
| 9 (Index of $F_2$) | D | $f_4$ |
|  | E | $f_5$ |
|  | C | $f_3$ |

Referring to Table 11, a source BS may configure a candidate cell list, including an operating band index, and a candidate cell index and carrier frequency information both belonging to each operating band. In the operating band $F_1$, the measurement values of the cell A 1305 and the cell B 1310 are the cell A 1305>the cell B 1310. Accordingly, the cell A 1305 and the cell B 1310 are arranged in this order. Next, in the operating band $F_2$, the measurement values of the cell C 1355, the cell D 1360, and the cell E 1365 are the cell D 1360>the cell E 1365>the cell C 1355. Accordingly, the cell D 1360, the cell E 1365, and the cell C 1355 are sequentially arranged. In other words, the candidate cell list is configured in order of candidate cells having a better RSRP or RSRQ on an operating-band basis.

Table 11 shows an example of the candidate cell list in which the candidate cells are arranged within each operating band according to the top-down method. In some embodiments, the candidate cells included in the candidate cell list may be arranged within each operating band according to the bottom-up method, as shown in Table 12.

TABLE 12

Candidate Cell List

| Band Index | Cell | Carrier Frequency |
|---|---|---|
| 4 (Index of $F_1$) | B | $f_2$ |
|  | A | $f_1$ |
| 9 (Index of $F_2$) | C | $f_3$ |
|  | E | $f_5$ |
|  | D | $f_4$ |

Figure 14:
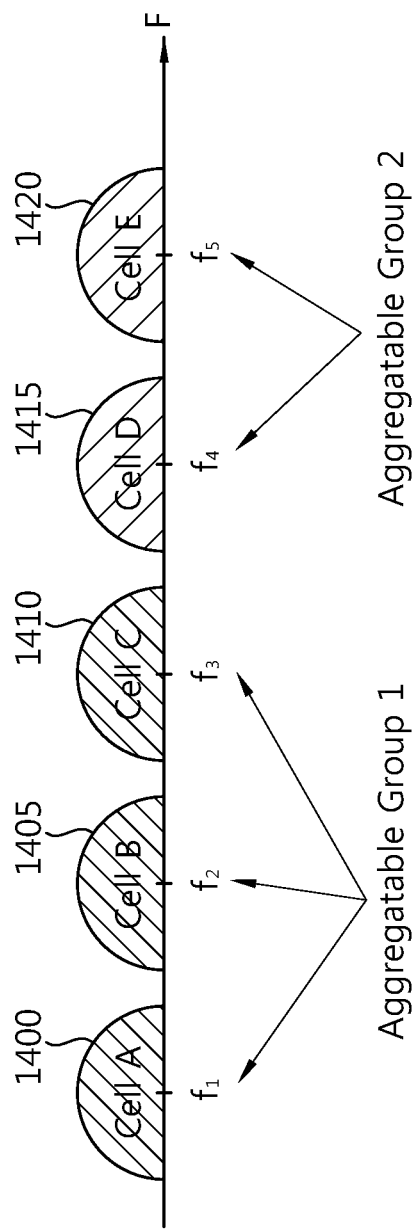
FIG. 14 is a diagram illustrating a method for configuring a candidate cell list according to an exemplary embodiment of the present invention.

FIG. 14 is a diagram illustrating a method for configuring a candidate cell list according to an exemplary embodiment of the present invention.

Referring to FIG. 14, a UE performs measurement for cells A 1400, B 1405, C 1410, D 1415, and E 1420. The cells have respective carrier frequencies $f_1$, $f_2$, $f_3$, $f_4$, and $f_5$. The cells may include aggregatable cells or non-aggregatable cells. The term 'aggregatable' includes the availability (or usage) of a specific frequency or a specific CC according to UE capability.

That is, whether a cell is aggregatable may be relatively determined according to a UE, a BS, or an operating band. Only cells belonging to the same operating band are not aggregatable, but cells belonging to different operating bands may be aggregatable and cells having non-contiguous frequencies may be aggregatable.

For example, a first UE may aggregate three cells, and a second UE may aggregate two cells, but may not aggregate three cells. For another example, a first BS may aggregate five cells, and a second BS may aggregate only four cells, but may not aggregate a fifth cell. For yet another example, three cells may be aggregatable in a first operating band, and two cells may be aggregatable in a second operating band.

A source BS determines the cells A 1400, B 1405, and C 1410 as an aggregatable group 1 and the cells D 1415 and E 1420 as an aggregatable group 2 by taking UE capability into consideration.

The source BS may configure an aggregatable cell list, including aggregatable group indices in which aggregatable cells from among all candidate cells are grouped, cell indices belonging to the aggregatable groups, and carrier frequencies, as shown in Table 13 below.

TABLE 13

Aggregatable Cell List

| Aggregatable Group Index | Cell | Carrier Frequency |
|---|---|---|
| 1 | A | $f_1$ |
|  | B | $f_2$ |

TABLE 13-continued

Aggregatable Cell List

| Aggregatable Group Index | Cell | Carrier Frequency |
|---|---|---|
|  | C | $f_3$ |
| 2 | D | $f_4$ |
|  | E | $f_5$ |

Accordingly, the source BS can send a handover request message, including the aggregatable cell list, to a target BS.

Here, the aggregatable cell list of Table 13 based on FIG. 14, together with a candidate cell list, may be transmitted from the source BS to the target BS in operation 1020 of FIG. 10. Alternatively, the aggregatable cell list may be transmitted from the source BS to the target BS through a different message from a message including the candidate cell list.

Figure 15:
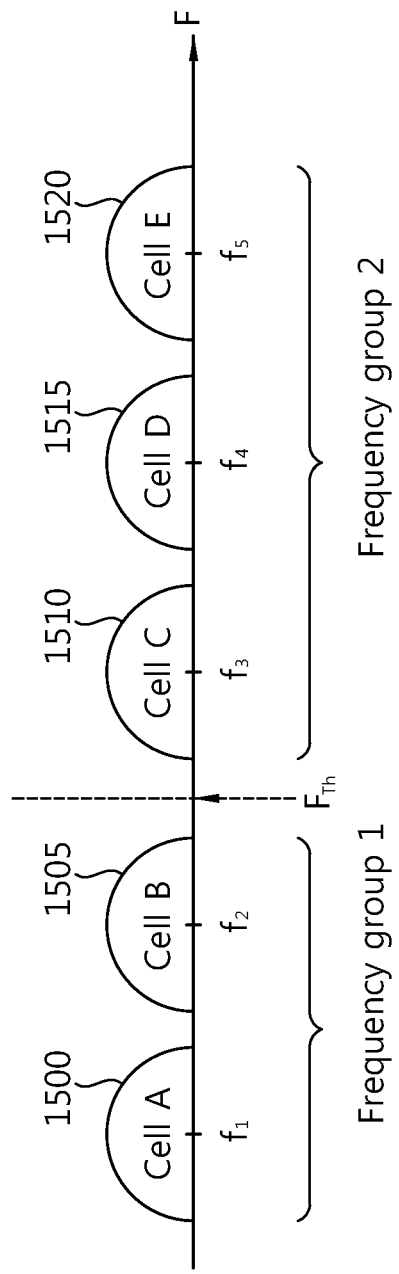
FIG. 15 is a diagram illustrating a method for configuring a candidate cell list according to an exemplary embodiment of the present invention.

FIG. 15 is a diagram illustrating a method for configuring a candidate cell list according to an exemplary embodiment of the present invention.

Referring to FIG. 15, a UE performs measurement for cells A 1500, B 1505, C 1510, D 1515, and E 1520. The cells have respective carrier frequencies $f_1$, $f_2$, $f_3$, $f_4$, and $f_5$. A source BS may group cells having the same or similar frequency characteristic based on a specific frequency characteristic.

For example, a method for determining a frequency group may include determining a cell, having a carrier frequency smaller than a specific threshold frequency $F_{TH}$, as a frequency group 1, and a cell, having a carrier frequency equal to smaller than the specific threshold frequency $F_{TH}$, as a frequency group 2. Accordingly, the source BS may configure a candidate cell list, including frequency group indices, candidate cell indices belonging to the frequency groups, and carrier frequency information about candidate cells, as shown in Table 14.

TABLE 14

List of Sensible Cells

| Sensitivity Group Index | Cell | Carrier Frequency |
|---|---|---|
| 1 | A | $f_1$ |
|  | B | $f_2$ |
| 2 | C | $f_3$ |
|  | D | $f_4$ |
|  | E | $f_5$ |

If the candidate cell list classified according to the frequency characteristic is used, a target BS can select an advantageous frequency based on frequency group information.

Furthermore, according to aspects of the present invention, the source BS may determine information about cells defined based on frequency similarity sensitivity (i.e., a list of sensible cells) and transmit the list of sensible cells to the target BS. The list of sensible cells includes information about a cell (or cells) classified according to a specific criterion.

The source BS may select one or more cells belonging to a range classified according to the criterion by checking RSRP or RSRQ values measured by a UE and may group the selected cells. This group may be called a frequency similarity sensitivity group. Here, the frequency similarity sensitivity group has a different criterion according to each group.

For example, a method for determining the frequency similarity sensitivity group may include determining a cell (or cells) having a similar measurement value as a specific cell 'a', as a frequency similarity sensitivity group 1. For another example, another cell 'b' may be selected from a cell (or cells) other than the frequency similarity sensitivity group 1, and a cell (or cells) having a similar measurement value as the cell 'b' may be selected as a frequency similarity sensitivity group 2.

Here, the source BS may configure a frequency similarity sensitivity group by selecting one of cells having good wireless communication with the UE or having a good quality or one of cells having bad wireless communication with the UE or having a bad quality according to a service environment of the target BS. For another example, the source BS may configure a frequency similarity sensitivity group by randomly selecting a cell (or cells) irrespective of the above criterion. Here, the source BS and the target BS may be associated with each other in relation to a measurement policy.

For example, a method for searching for a cell (or cells) belonging to a frequency similarity sensitivity group may include checking whether a measurement value for one cell and a measurement value for a next cell are within a threshold value and registering the cells with a group.

The measurement values include quantities or values, such as the RSRP and/or the RSRQ, and may be a dB value.

TABLE 15

| CELL | MEASUREMENT VALUE |
|---|---|
| A | 10 |
| B | 7 |
| C | 3 |
| D | 12 |
| E | 8 |

The list of sensible cells may be configured as in Table 16 so that the frequency similarity sensitivity groups are distinguished from each other.

TABLE 16

List of Sensible Cells

| Sensitivity Group Index | Cell | Carrier Frequency |
|---|---|---|
| 1 | B | $f_1$ |
|  | C | $f_3$ |
| 2 | A | $f_1$ |
|  | D | $f_4$ |
|  | E | $f_5$ |

Figure 16:
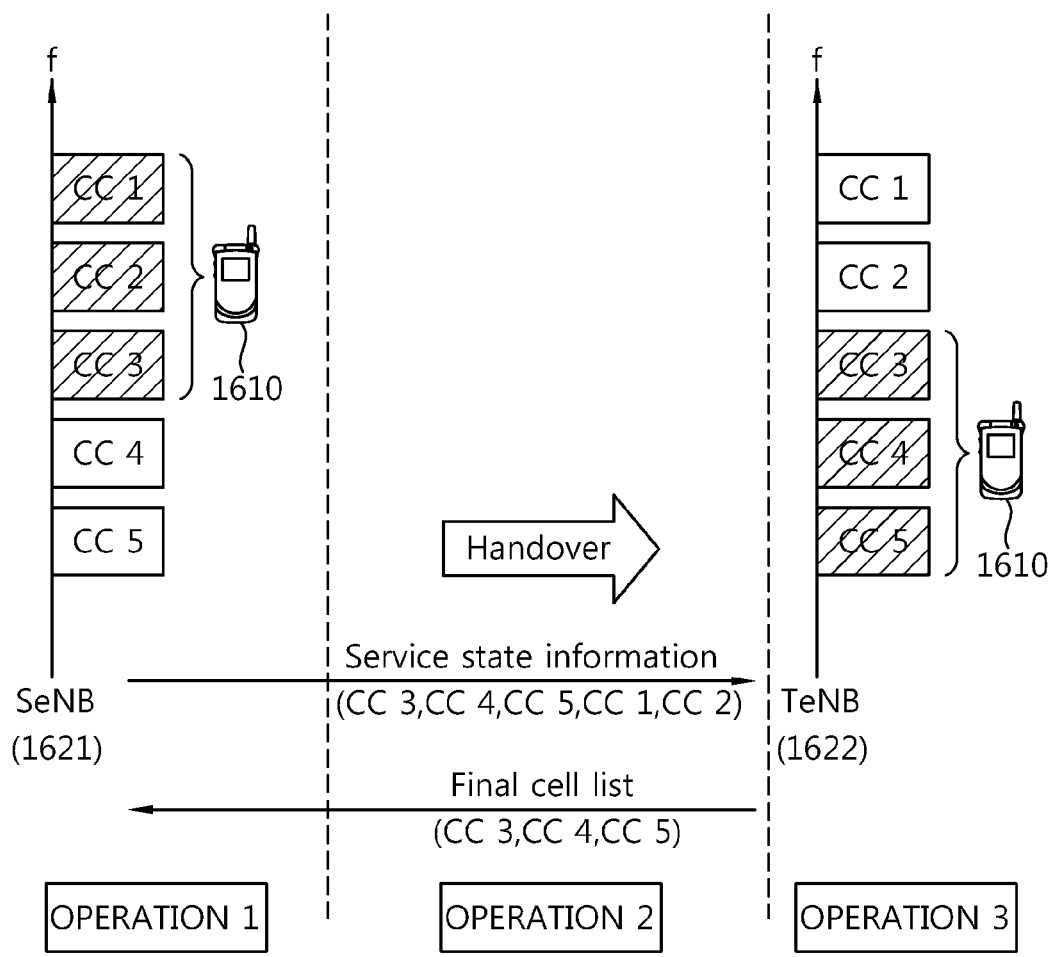
FIG. 16 is a diagram illustrating a process of reconfiguring the CCs of a UE according to a method for performing handover according to an exemplary embodiment of the present invention.

FIG. 16 is a diagram illustrating a process of reconfiguring the CCs of a UE according to a method for performing handover according to an exemplary embodiment of the present invention.

Referring to FIG. 16, in operation 1, a source BS (e.g., an SeNB) 1621 is providing 5 CCs (i.e., CC1, CC2, CC3, CC4, and CC5). A UE 1610 is currently served through the CC1, CC2, and CC3. Here, a PCC is the CC3, and SCCs are the CC1 and the CC2. When preparing for handover, the UE 1610 performs measurement for the five CCs and transmits a measurement result thereof to the source BS 1621 through a measurement report.

In operation 2, the source BS 1621 transmits service state information, including a candidate cell list regarding the CCs, to a target BS (e.g., a TeNB) 1622 using the measurement result received from the UE 1610. The candidate cell list may be configured according to the methods described with reference to FIGS. 11 to 15. It is assumed that the candidate cell list is configured in order of the CC3, the CC4, the CC5, the CC2, and the CC1 according to the top-down method.

Furthermore, in operation 2, the source BS 1621 may transmit to the target BS 1622 the service state information, including an aggregatable cell list configured by taking UE capability into consideration.

Furthermore, in operation 2, the source BS 1621 may transmit to the target BS 1622 the service state information, including a list of sensible cells including information about a cell (or cells) defined based on frequency similarity sensitivity.

The source BS 1621, according to aspects of the present invention, may transmit to the target BS 1622 the service state information, including at least one of the candidate cell list, the aggregatable cell list, and the list of sensible cells.

Here, the source BS 1621 may configure the candidate cell list including upper L cells or lower L cells, from among cells included in the list of sensible cells, as candidate cells and transmit the candidate cell list to the target BS 1622. Furthermore, the source BS 1621 may configure the candidate cell list including upper L' cells or lower L' cells, from among cells included in the aggregatable cell list, as candidate cells and transmit the candidate cell list to the target BS 1622.

The target BS 1622 determines one or more final cells for supporting service for the UE 1610 based on at least one of the candidate cell list, the aggregatable cell list, and the list of sensible cells according to whether the target BS 1622 supports the service and the degree of load into consideration. The final cells may be transmitted in the form of a list.

The final cell list may be transmitted based on index information or a predetermined or other order (arrangement) indicating the final cells.

That is, the target BS 1622 may finally determine upper N cells or lower M cells (e.g., the CC3, the CC4, and CC5 in FIG. 16) for maintaining quality of service for the UE as CCs to be allocated to the UE 1610.

Accordingly, the target BS 1622 configures the CC3, the CC4, and the CC5 to be allocated to the UE 1610 and transmits the final cell list, including the CC3, the CC4, and the CC5, back to the source BS 1621.

In operation 3, the UE 1610 may reconfigure the CC3, the CC4, and the CC5 according to the list determined by the target BS 1622. In this state, if an activation command is received from the target BS 1622, the UE 1610 is changed into an activation state in which it receives the CC3, the CC4, and the CC5.

As described above, since the UE 1610 determines information about a number of CCs to be used in the target BS 1622, service of the degree which was provided by the source BS 1621 can be provided to the UE 1610 during handover and after the handover.

Figure 17:
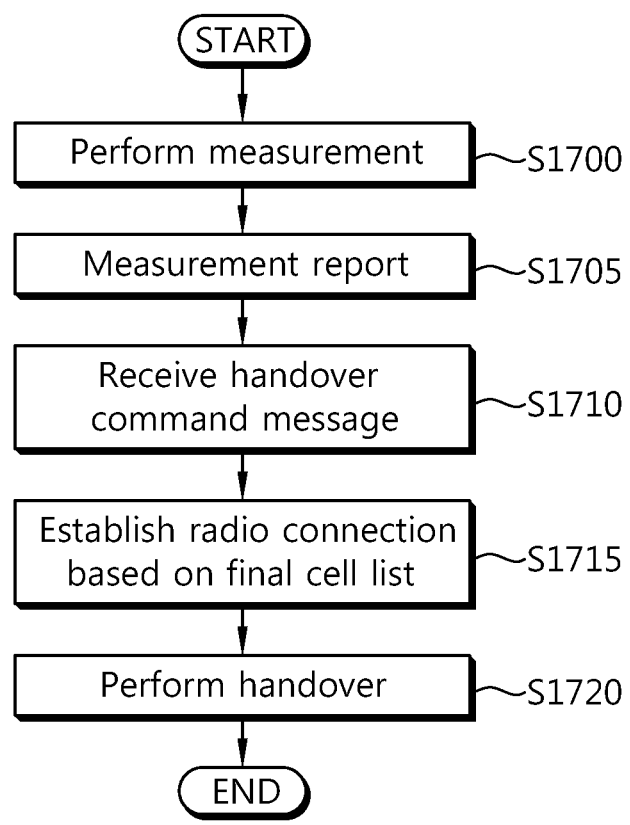
FIG. 17 is a flowchart illustrating a method for a UE performing handover according to an exemplary embodiment of the present invention.

FIG. 17 is a flowchart illustrating a method for a UE performing handover according to an exemplary embodiment of the present invention.

Referring to FIG. 17, the UE performs measurement in operation S1700. The UE may perform measurement for all carrier frequencies, all CCs, or all cells. Alternatively, the UE may perform measurement for some carrier frequencies.

The UE transmits a measurement report regarding the measurement results to a source BS in operation S1705. Here, the measurement report includes service state information. The service state information includes information, such as that shown in Table 1. In particular, the service state information may further include not only the candidate cell list configured according to the methods described with reference to FIGS. 11 to 15, but also the aggregatable cell list and the list of sensible cells, which may be configured according to various embodiments.

The UE receives a handover command message from the source BS in operation S1710. The handover command message may include a final cell list determined by a target BS.

The UE performs RRC establishment or re-establishment for a cell which is determined according to the final cell list in operation S1715. The final cell list provides information about a primary serving cell and a secondary serving cell. Accordingly, the UE can perform RRC establishment or re-establishment for the primary serving cell and the secondary serving cell which will be used in the target BS. The established or re-established cell (or CCs) may be in a deactivation state or an activation state.

The UE performs handover on the RRC established or re-established cell (or CCs) in operation S1720. The UE may first attempt the handover to the primary serving cell and, if the handover to the primary serving cell is not successful, may further attempt the handover to the secondary serving cell.

Figure 18:
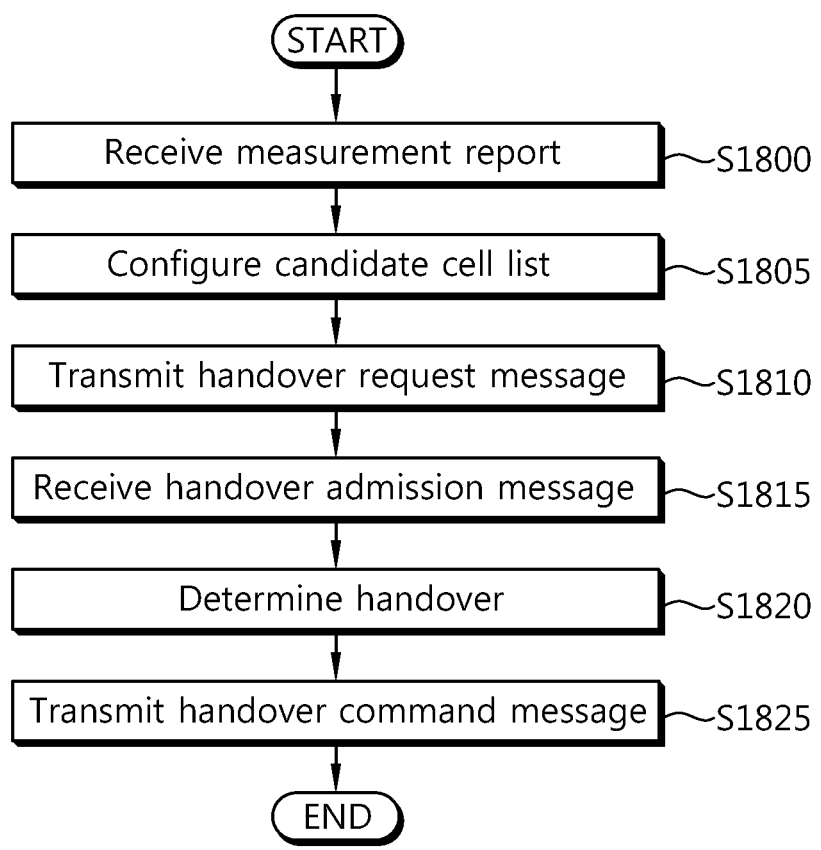
FIG. 18 is a flowchart illustrating a method for a source BS performing handover according to an exemplary embodiment of the present invention.

FIG. 18 is a flowchart illustrating a method for a source BS performing handover according to an exemplary embodiment of the present invention.

Referring to FIG. 18, the source BS receives a measurement report from a UE in operation S1800. The measurement report includes a measurement result for a frequency which is set in the UE by the source BS. The source BS configures a candidate cell list in operation S1805. The candidate cell list is a list in which one or more candidate cells that may become a primary serving cell or a secondary serving cell in relation to the UE are arranged by a target BS. A method for selecting the candidate cells and a method for arranging the candidate cells may be the same as those described with reference to FIGS. 11 to 15.

Furthermore, the source BS may configure a list of sensible cells or an aggregatable cell list in addition to the candidate cell list. Furthermore, the source BS may configure the candidate cell list which may be set according to the list of sensible cells or the aggregatable cell list according to aspects of the present invention.

The source BS transmits a handover request message including service state information, including at least one of the candidate cell list, the list of sensible cells, and the aggregatable cell list, to the target BS in operation S1810. In response to the handover request message, the source BS receives a handover ACK message, including a final cell list, from the target BS in operation S1815.

The handover request message and the handover ACK message may be transmitted or received over a backbone network and may be transmitted or received, for example, via an X2 interface.

The source BS determines handover for the UE in operation S1820 and transmits a handover command message, including the final cell list, to the UE in operation S1825.

Figure 19:
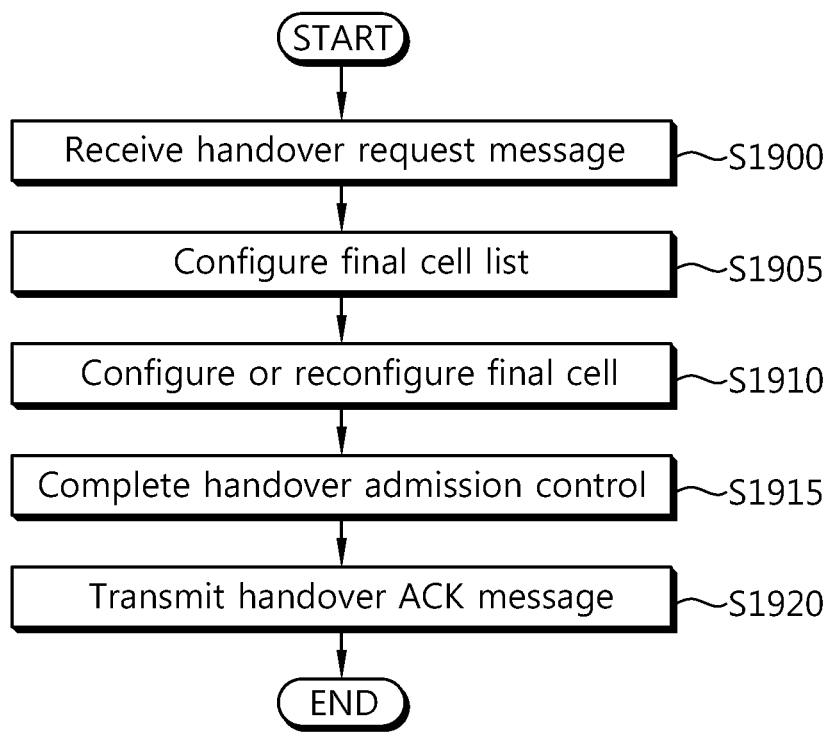
FIG. 19 is a flowchart illustrating a method for a target BS the performing handover according to an exemplary embodiment of the present invention.

FIG. 19 is a flowchart illustrating a method for a target BS the performing handover according to an exemplary embodiment of the present invention.

Referring to FIG. 19, the target BS receives a handover request message, including service state information, from a source BS in operation S1900. The service state information includes at least one of a candidate cell list, a list of sensible cells, and an aggregatable cell list for a specific UE.

The target BS checks the adequacy of several candidate cells included in the candidate cell list, reconfigures candidate cells if necessary, and configures a final cell list including final cells that are determined to be most suitable for the UE in operation S1905.

The target BS configures or reconfigures the final cells included in the final cell list in operation S1910. Here, the configured or reconfigured candidate cells may be primary serving cells or secondary serving cells.

The target BS completes handover admission control in operation S1915 and transmits a handover ACK message, including the final cell list, to the source BS in operation S1920.

Figure 20:
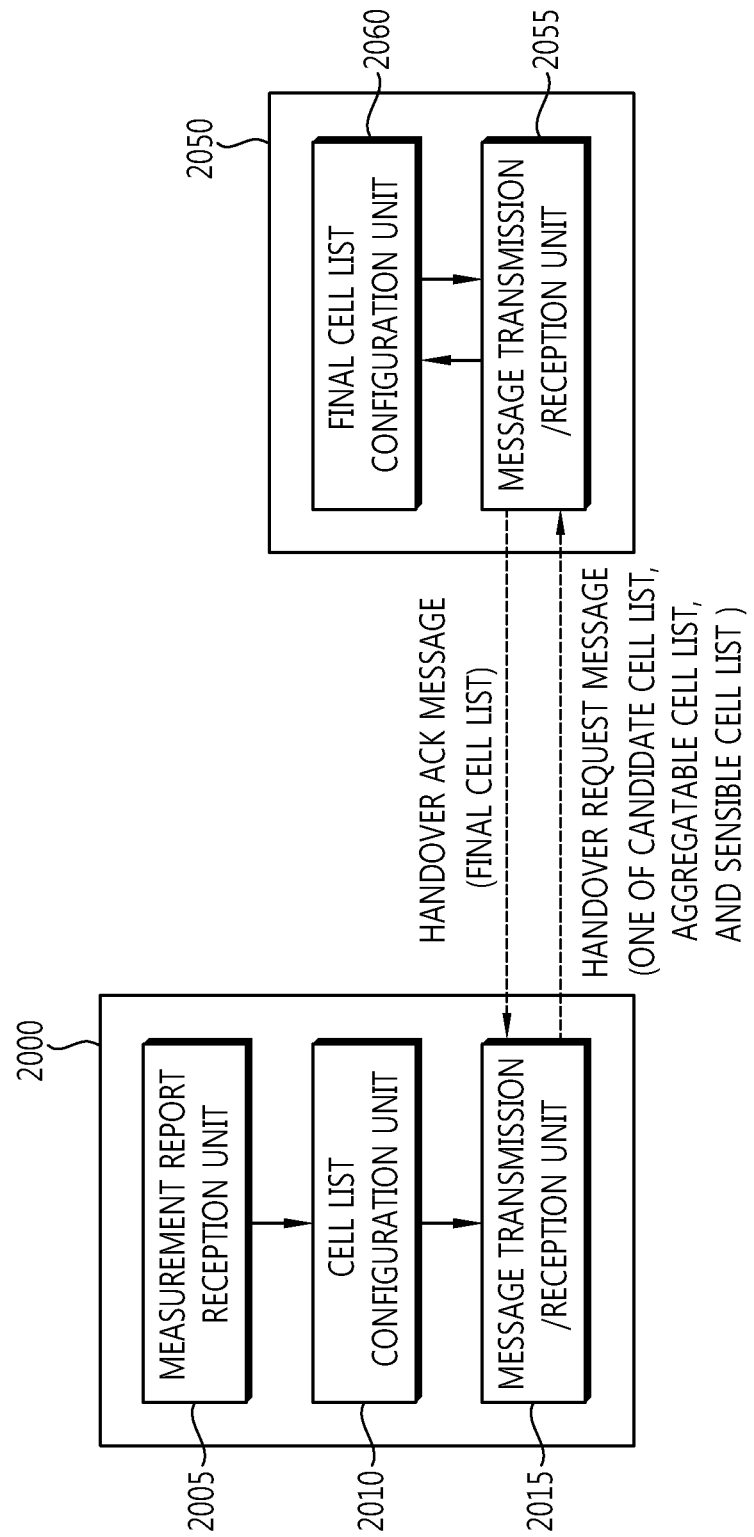
FIG. 20 is a block diagram of a source BS and a target BS according to an exemplary embodiment of the present invention.

FIG. 20 is a block diagram of a source BS and a target BS according to an exemplary embodiment of the present invention.

Referring to FIG. 20, the source BS 2000 includes a measurement report reception unit 2005, a cell list configuration unit 2010, and a message transmission/reception unit 2015.

The measurement report reception unit 2005 receives a measurement report from a UE. The measurement report includes measurement results for cells or frequencies which are set in the UE by the source BS 2000. The measurement results include measurement values regarding measurable factors, such as RSRPs, RSRQs, and power levels of cells, which are determined based on a measurement report configuration.

The cell list configuration unit 2010 configures a candidate cell list available in the target BS 2050, based on the measurement result. In order to configure the candidate cell list, the best N report method, the top-down method, the bottom-up method, the aggregatable grouping method, the grouping method according to a frequency characteristic or the like may be used.

The cell list configuration unit 2010 may configure at least one of the candidate cell list, an aggregatable cell list, and a list of sensible cells. Here, the candidate cell list may be configured to include upper L cells or lower L cells, from among cells included in the list of sensible cells, as candidate cells. Alternatively, the candidate cell list may be configured to include upper L' cells or lower L' cells, from among cells included in the aggregatable cell list, as candidate cells.

The message transmission/reception unit 2015 transmits a handover request message to the target BS 2050. The handover request message includes at least one of the candidate cell list, the aggregatable cell list, and the list of sensible cells, an average transfer rate, such as that shown in Table 1, the number of component carriers used for the source BS, UE capacity, and service state information, such as RSRPs or RSRQs for cells having a measurement report.

The target BS 2050 includes a message transmission/reception unit 2055 and a final cell list configuration unit 2060.

The message transmission/reception unit 2055 receives the handover request message from the source BS 2000, extracts the candidate cell list from the handover request message, and transfers the candidate cell list to the final cell list configuration unit 2060.

The final cell list configuration unit 2060 checks the adequacy of candidate cells included in the candidate cell list according to various determination and detection methods and finally selects a cell or cells most suitable for a UE. The final cell list configuration unit 2060 configures a list including the selected final cell(s).

The message transmission/reception unit 2055 transmits a handover ACK message, including the final cell list, to the source BS 2000.

All the functions described above may be executed by a microprocessor, a controller, a microcontroller, or a processor, such as an ASIC (Application Specific Integrated Circuit) according to software or program codes coded to execute the functions. The design, development, and implementation of the codes may be said to be evident to those skilled in the art based on the description of the aspects of the present invention.

According to aspects of the present invention, a UE can adequately select CCs or a cell to be used after handover, and a probability that CCs that are unnecessary or cannot be used by the UE are configured or selected is decreased. Accordingly, system efficiency can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for a source Base Station (BS) performing handover in a multiple component carrier system, the method comprising:
   receiving a measurement report, comprising measurement results for one or more cells configured by a carrier aggregation, from a User Equipment (UE);
   configuring service state information comprising a candidate cell list in which the one or more cells are arranged in an order based on the measurement results;
   transmitting a handover request message, comprising the service state information, to a target BS, the handover request requesting handover of the UE to the target BS;
   receiving a handover ACK message, indicating admission of the handover, from the target BS; and
   transmitting a handover command message, commanding the handover, to the UE.

2. The method as claimed in claim 1, wherein the order of the one or more cells in the candidate cell list are arranged in a decreasing order according to values of the measurement results.

3. The method as claimed in claim 1, wherein the service state information further comprises the measurement results.

4. The method as claimed in claim 3, wherein the measurement results comprise a Reference Signal Received Power (RSRP) or a Reference Signal Received Quality (RSRQ).

5. A method for a target Base Station (BS) performing handover in a multiple component carrier system, the method comprising:
   receiving service state information, comprising a candidate cell list in which one or more cells configured by a carrier aggregation are arranged in an order based on measurement results for the one or more cells, from a source BS through a handover request message; and
   transmitting a handover ACK message, indicating admission of the handover, to the source BS.

6. The method as claimed in claim 5, wherein the order of the one or more cells in the candidate cell list are arranged in a decreasing order according to values of the measurement results.

7. The method as claimed in claim 5, wherein the service state information further comprises the measurement results.

8. The method as claimed in claim 7, wherein the measurement results comprise a Reference Signal Received Power (RSRP) or a Reference Signal Received Quality (RSRQ).

9. A source Base Station (BS) to perform handover in a multiple component carrier system, the source BS comprising:
   a measurement report reception unit to receive a measurement report, comprising measurement results for one or more cells configured by a carrier aggregation, from a User Equipment (UE);
   a cell list configuration unit to configure a candidate cell list in which the one or more cells are arranged in an order based on the measurement results; and a message transmission/reception unit to transmit, to a target BS, a handover request message, comprising the candidate cell list and requesting handover of the UE to the target BS, and to receive, from the target BS, a handover ACK message, indicating admission of the handover.

10. The source BS as claimed in claim 9, wherein the handover request message further comprises the measurement results.

11. The source BS as claimed in claim 10, wherein the measurement results comprise a Reference Signal Received Power (RSRP) or a Reference Signal Received Quality (RSRQ).

12. The source BS as claimed in claim 9, wherein the cell list configuration unit configures the order of the candidate cell list in a decreasing order according to values of the measurement results.

13. A method for a User Equipment (UE) performing handover in a multiple component carrier system, the method comprising:
  transmitting, to a source BS, a measurement report, comprising measurement results regarding one or more cells configured by a carrier aggregation and a candidate cell list in which the one or more cells are arranged in an order based on the measurements;
  receiving, from the source BS, a handover command message instructing the UE to perform handover to a target BS; and
  reconfiguring the one or more cells in the candidate cell list and available in the target BS.

* * * * *